Dec. 13, 1960  S. G. SYLVAN  2,964,125
ELECTRICAL PRECIPITATOR

Filed Sept. 8, 1958  5 Sheets-Sheet 1

INVENTOR.
STIG G. SYLVAN

BY Ralph B. Brick
ATTORNEY

Dec. 13, 1960 S. G. SYLVAN 2,964,125
ELECTRICAL PRECIPITATOR
Filed Sept. 8, 1958 5 Sheets-Sheet 2
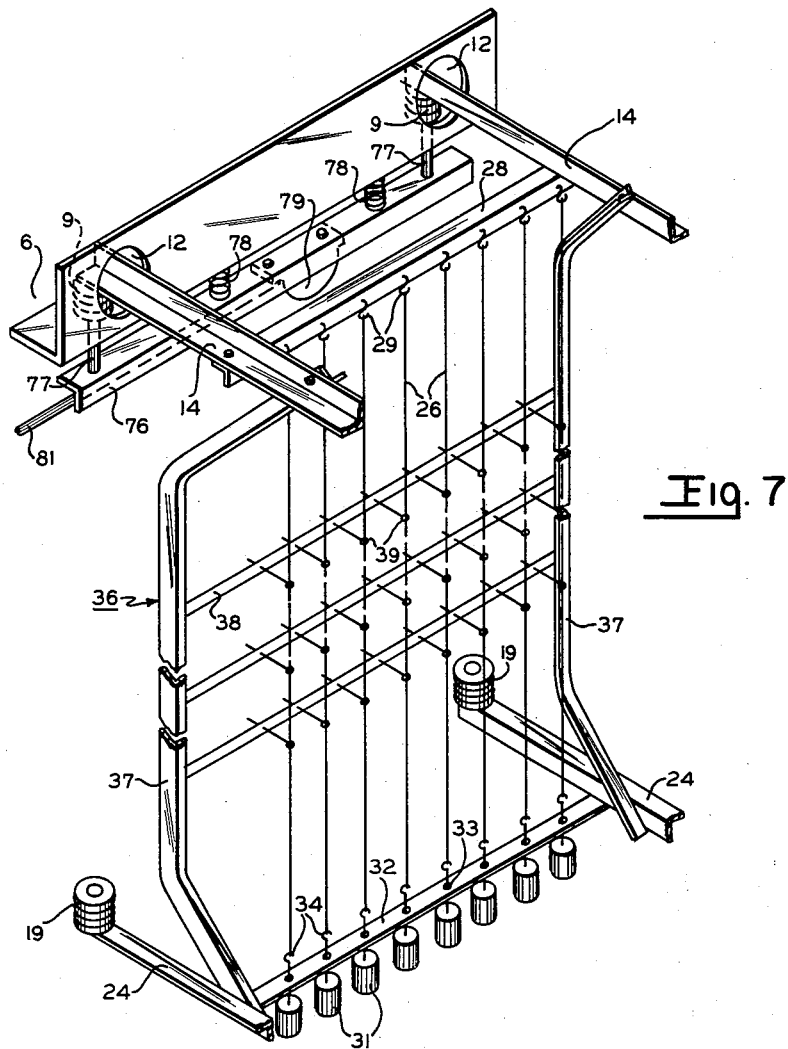
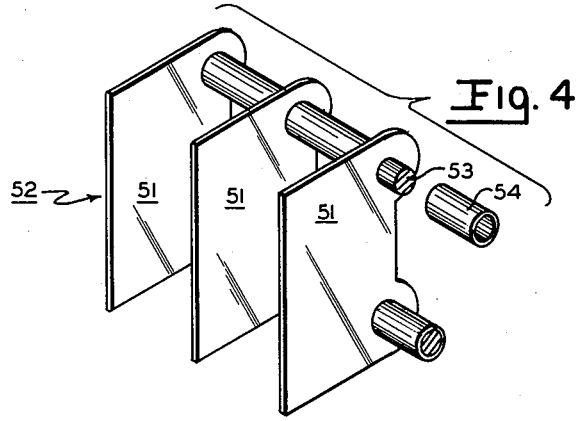
INVENTOR.
STIG G. SYLVAN
BY Ralph B. Brick
ATTORNEY

INVENTOR.
STIG G. SYLVAN

Dec. 13, 1960　　　　　S. G. SYLVAN　　　　　2,964,125
ELECTRICAL PRECIPITATOR

Filed Sept. 8, 1958　　　　　　　　　　　　5 Sheets-Sheet 4

INVENTOR.
STIG G. SYLVAN
BY
Ralph B. Brick
ATTORNEY

Dec. 13, 1960 S. G. SYLVAN 2,964,125
ELECTRICAL PRECIPITATOR
Filed Sept. 8, 1958 5 Sheets-Sheet 5

INVENTOR.
STIG G. SYLVAN
BY
Ralph B. Quick
ATTORNEY

United States Patent Office 2,964,125
Patented Dec. 13, 1960

2,964,125

ELECTRICAL PRECIPITATOR

Stig G. Sylvan, Louisville, Ky., assignor to American Air Filter Company, Inc., Louisville, Ky., a corporation of Delaware Filed Sept. 8, 1958, Ser. No. 759,498

15 Claims. (Cl. 183—7)

This invention relates to electrical precipitation apparatus and more particularly to improvements in apparatus for electrical precipitation of the kind which charges dust particles in an aerosol by a stream of gaseous ions and then precipitates such particles on a collecting surface under the influence of an electrostatic field of force.

In order to charge the dust particles in an aerosol for purposes of precipitation, it has been the practice to pass the aerosol in a stream through an electrostatic field of force produced by maintaining an electrostatic potential difference between a fine wire, or other suitable discharge electrode, and a pair of substantially parallel spaced collecting plates disposed on opposite sides of such discharge electrode and forming a gap therebetween. It has been discovered that as the aerosol stream passes through the field of force created in the gap, some of the dust particles are retained on the collecting plates and, if not removed, a dust coating of sufficient magnitude results to cause a change in voltage distribution within the gap through which the aerosol is passed. This change in voltage distribution is brought about by a phenomenon known as "back-ionization," an electrostatic field arising within the pores of the coating which tends to neutralize the ionization between the gap and thereby to render the apparatus inoperative. To keep the collecting plates clean and thus avoid such undesirable "back-ionization," various mechanical arrangements have been employed in the past to remove the dust particles retained on the collecting plates. However, these past arrangements have not proven to be entirely satisfactory since problems of non-uniform dust removal and dust particle redeposit through entrainment have occurred. In attempts to avoid these problems, apparatus has been employed which has been so large that it could not be transported or erected on the site of operation in one piece. As a result, a great portion of the production work has been required in the field at much greater cost than factory work. Furthermore, not only has such equipment been bulky and expensive to construct and maintain but, in addition, problems of non-uniform dust removal have still persisted, leaving unbalanced electrostatic fields of force through which the aerosol streams are passed.

The present invention, recognizing these problems of past arrangements, provides an electrical precipitator apparatus which is compact and efficient in its operation and which can be factory constructed for ready transportation and immediate erection at the site of operation. Further, the present invention provides an electrical precipitator apparatus which lends itself readily to multiple arrangements in series and/or in parallel without significant power loss in the event of partial interruption. Thus, the apparatus of the persent invention can be readily adapted for efficient large gas volume cleaning operations. In addition, the present invention, recognizing the importance of maintaining a uniform ionization field throughout the ionizing zone of an electrical precipitator, provides a precipitator apparatus which can bring about effectively such a uniform ionization field in a straightforward, efficient manner without interruption of gas cleaning operations. Further, within the precipitator apparatus which brings about such a uniform ionization field, the present invention provides a means which cleans the collecting electrode plates of the apparatus in an efficient, positive manner and at the same time provides a seal to prevent the bypassage of dirty gases. Various other features of the present invention will become obvious to one skilled in the art upon reading the disclosure set forth hereinafter.

More particularly, the present invention provides in an electrical precipitator having a housing with gas inlet and gas outlet means spaced to define a gas flow passage therebetween, an ionizing section disposed in the gas flow passage adjacent the gas inlet means, the ionizing section including ionizing electrode means and collecting electrode means spaced from the ionizing means on opposite sides thereof, means to maintain the ionizing electrode means in proper alignment, means to move the collecting electrode means along opposite sides of the ionizing means into and out of the ionizing section through a zone positioned outside the gas flow passage in paths continuously parallel to each other, means to clean the collecting electrode means as the collecting electrode means pass through the zone and before they are re-introduced into the ionizing section, and guide means adjacent the means for cleaning the collecting electrode means to insure proper alignment of the collecting electrode means.

It is to be understood that various changes can be made by one skilled in the art in the arrangement, form and construction of the apparatus disclosed herein without departing from the scope or spirit of the present invention.

Referring to the drawings:

Figure 4 is an enlarged perspective view of a portion of the collecting electrode plate assembly;

Figure 7 is an enlarged schematic perspective view of the intermediate support frame for the ionizing wires of the ionizing section of the apparatus of Figure 1;

Figure 1:
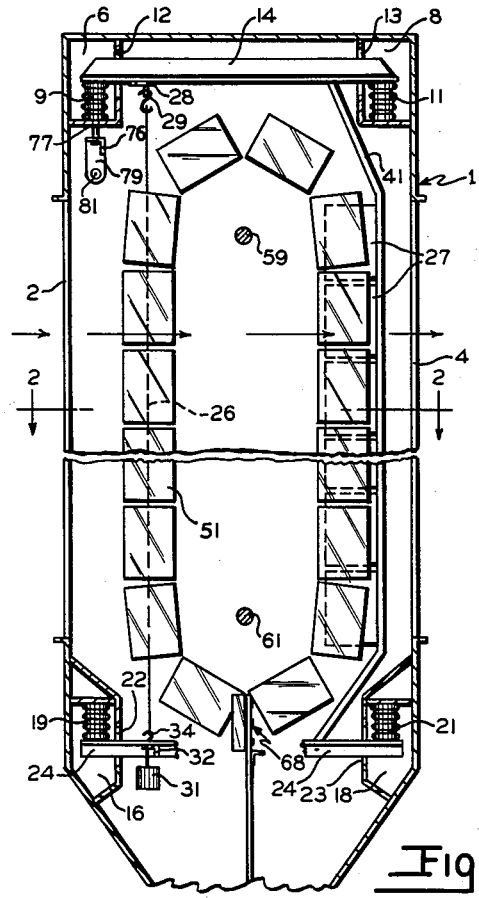
Figure 1 is a vertical schematic section through an electrical precipitator apparatus, disclosing one embodiment of the present invention, the sprocket driven, endless chain drive assembly for the collecting electrode plates and a number of other parts being omitted for the sake of clarity.

Referring to Figure 1 of the drawings, the electrical precipitator illustrated comprises a vertically disposed housing 1 which can be fabricated and erected at factory site from any suitable sheet metal material. Positioned on what serves as the upstream side of housing 1 is gas inlet 2 and positioned opposite gas inlet 2 on what serves as the downstream side of housing 1 is gas outlet 4, the gas inlet and gas outlet defining therebetween a gas passageway which extends horizontally through the housing 1.

In the upper portion of housing 1, above the horizontally extending gas passageway and extending transverse the direction of gas flow, is a pair of spaced insulator chambers 6, 8. Chamber 6, which extends above the gas passageway adjacent the gas inlet 2 of the housing 1, is provided with a pair of spaced insulators 9; and, chamber 8, which extends above the gas passageway adjacent the gas outlet 4 of housing 1, is provided with a pair of spaced insulators 11, the corresponding insulators in chambers 6 and 8 thus providing insulator pairs 9, 11. The chambers 6 and 8, like the housing 1, can be fabricated from any suitable sheet metal material and, if desired, can be pressurized to keep the chambers free from collection of dust particles and other undesirable materials.

As can be seen more clearly in Figure 7 of the drawings, the sheet metal material which forms chamber 6 is provided with vertically extending spaced apertures 12. Aligned with apertures 12, in the sheet metal material which forms chamber 8 (Figure 1), are corresponding vertically extending spaced apertures 13, the corresponding apertures for chambers 6 and 8 thus providing aperture pairs 12, 13. Extending freely through each of aperture pairs 12, 13 is a right angle member 14, the ends of each angle member 14 being supported by an insulator pair 9, 11. It is to be noted that a sufficient clearance is provided between each angle member 14 and the periphery of apertures 12, 13 through which it passes so as to permit, during the course of operation of the apparatus, vibrating movement of these angle members 14 without undesirable short circuiting. This vibrating movement, described hereinafter, serves to accomplish a rapping effect on spaced discharge electrode sections suspended through the angle members 14, as is also described hereinafter.

Referring to Figures 1 and 7, it can be seen that, in the lower portion of housing 1, below the horizontally extending gas passageway, a structural arrangement is provided which is similar to that provided in the upper portion of the housing and described above. This structural arrangement includes a pair of spaced insulator chambers 16, 18. Chamber 16, which extends transverse to and below the gas passageway adjacent gas inlet 2 of housing 1, is provided with a pair of spaced insulators 19. Chamber 18, which extends transverse to and below the gas passageway adjacent gas outlet 4 of housing 1, is provided with a pair of spaced insulators 21 (only one being disclosed in the drawings), the corresponding insulators in chambers 16 and 18 thus providing insulator pairs 19, 21. The chambers 16 and 18, like chambers 6 and 8, can be fabricated from any suitable sheet metal material and also, if desired, can be pressurized to keep them free from collection of dust particles and other undesirable materials.

In a manner similar to that described for chambers 6 and 8, the sheet material which forms chamber 16 and 18 is provided with vertically extending, spaced apertures 22 and aligned, vertically extending, spaced apertures 23 respectively, the corresponding apertures for chamber 16 and 18 thus providing aperture pairs 22, 23 (only one such pair of apertures being disclosed in the drawings).

Extending freely through each of aperture pairs 22, 23 is a short, cantilever type right angle member 24, one end of each of the angle members 24 extending through an aperture 22 being supported by one of the insulators 19 and one end of each of the angle members 24 extending through an aperture 23 being supported by one of the insulators 21. It is to be noted that, as described for angle members 14, a sufficient clearance is provided between each angle member 24 and the periphery of the aperture through which it passes to permit vibrating movement of the angle member 24 without undesirable short circuiting. It also is to be noted that each of angle members 24 in the lower portion of housing 1 extends directly below and parallel to an angle member 14 aforedescribed as positioned in the upper portion of housing 1.

Figure 2:
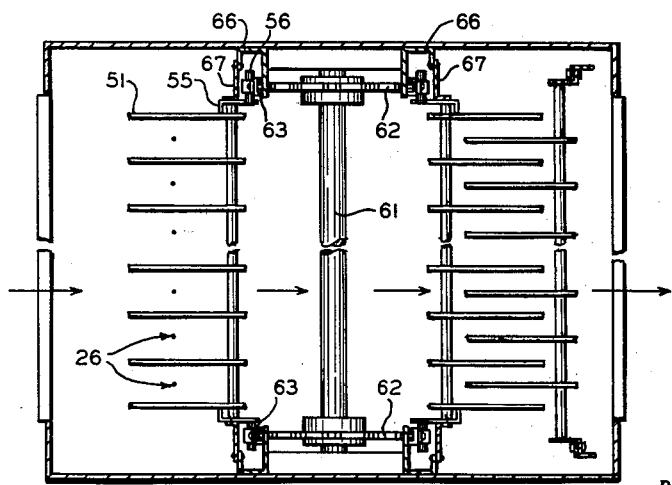
Figure 2 is an enlarged plan section of the apparatus of Figure 1, taken in a horizontal plane passing through line 2—2 of Figure 1, this figure disclosing some of the detail of the sprocket driven, endless chain drive assembly.

In the embodiment of the electrical precipitator set forth in Figures 1 through 7, two stationary electrode sections are provided, one of these sections being adjacent the gas inlet 2 of housing 1 and being made up of vertically extending spaced apart discharge or ionizer electrode wires 26 and the other section being adjacent the gas outlet 4 of housing 1 and being made up of vertically spaced banks of vertically extending, parallel field electrode plate members 27 (Figures 1 and 2).

To support ionizer wires 26, which form the discharge electrode section adjacent the gas inlet 2 of housing 1, a right angle member 28 is arranged to extend transverse the spaced angle members 14 in the upper portion of housing 1 above gas inlet passage 2, the opposite ends of the horizontal leg of right angle member 28 facing and being fastened to the horizontal legs of right angle members 14. The vertical leg of angle member 28 is provided with a series of spaced holes and through each is inserted a wire supporting hook 29. One end of each ionizer wire 26 is fastened, in turn, to a hook 29 and at the opposite end of each wire 26, a weight member 31 is fastened, the weight member serving to maintain the wire 26 to which it is fastened in taut, vertically extending position.

To insure proper alignment of ionizer wires 26, a right angle member 32 (Figures 1 and 7) is provided to extend transverse the spaced angle members 24 which cantilever from insulators 19, the opposite ends of member 32 being fastened to the vertical legs of members 24. The horizontal leg of member 32 is provided with a series of small, spaced apertures 33, through each of which extends a hook portion 34 of a weight 31. The hook portion 34 of each weight member 21 is fastened, in turn, to one end of an ionizer wire 26 to maintain the wire in taut, vertically extending position as aforedescribed.

In order to insure a further alignment of wires 26 throughout their entire vertically extending length, an intermediate support frame 36 is provided (Figure 7). Support frame 36 includes a pair of spaced, parallel U-shaped right angle members 37, each member 37 extending vertically between a right angle member 14 and the right angle member 24 immediately therebelow with its opposite ends fastened to such members 14 and 24 respectively. Extending horizontally between spaced members 37 and fastened thereto are spaced horizontal bars 38. Each of bars 38 is provided with a set of spaced eye-hook members 39, the ionizing wires 26 passing through these eye-hooks to be maintained in proper alignment intermediate their ends.

To support the electrode plates 27 which form the field electrode section at the downstream side of housing 1 (Figures 1 and 6), a pair of spaced, parallel, vertically extending right angle support columns 41 are provided. Each column 41 is arranged to extend between one of the horizontally extending right angle members 14 in the upper portion of housing 1 and the horizontally extending right angle member 24 immediately therebelow in the lower portion of housing 1, the ends of the column being fastened by bolting or the like to such horizontally extending right angle members.

Figure 6:
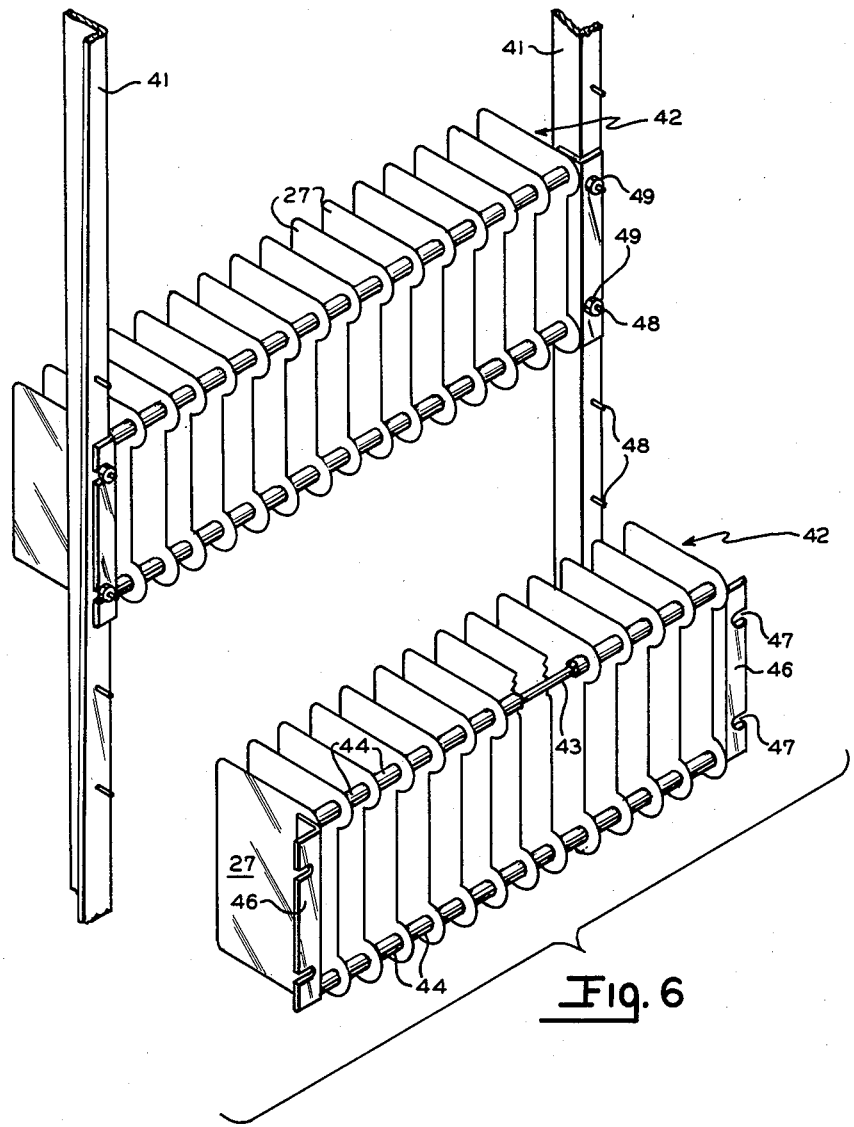
Figure 6 is an enlarged, exploded perspective view of a portion of the field electrode plate assembly.

As can be seen in Figure 6, the plates 27 are arranged in a plurality of banks 42, the banks 42 being disposed in vertically spaced relationship one above the other to form a vertical row between the columns 41 to which they are attached. More specifically, each plate 27 of each bank is provided with an aperture in what serves when the plate is in final assembly as the upper downstream corner of the plate and with an aperture in what serves when the plate is in such final assembly as the lower downstream corner of the plate. The plates 27 of each bank 42 are arranged in horizontally spaced, parallel relationship with the upper and lower apertures of each plate in alignment with the upper and lower apertures of an adjacent plate. To hold each bank of plates 27 together, upper and lower horizontal support rods 43 are provided to extend through the aligned plate apertures, the rods 43 having mounted thereon tubular spacer elements 44 which serve to maintain adjacent plates 27 of a bank in spaced relationship with respect to each other. The ends of rods 43 of each bank are fastened to right angle members 46 by some suitable means such as bolting or welding. In order to fasten the bank of plates 42 to columns 41, the right angle members 46 are each provided with a pair of slots 47, slots 47 being arranged to engage with spaced bolts 48 on columns 41. When slots 47 of a bank 42 are in proper engagement with bolts 48, nuts 49 are fastened to the bolts to hold the bank of plates firmly in position.

The abovedescribed spaced electrode sections, including the discharge electrode wires 26 which serve to form the upstream section and the vertical row of field electrode plate banks 42 which serve to form the downstream section, are so disposed in housing 1 as to interleave with moveable collecting electrode plates 51, plates 51 being arranged in plate banks 52 in a manner similar to the plate banks 42 aforedescribed.

Referring more specifically to Figure 4 of the drawings, it can be seen that each plate 51 of each bank 52 is provided with an upper and lower aperture arrangement similar to the aperture arrangement for plate 27 and the plates 51, like plates 27, are arranged in horizontally spaced parallel relationship with the upper and lower apertures of each plate in alignment with the upper and lower apertures of an adjacent plate. To hold each bank of plates 51 together, upper and lower horizontal support rods 53 extend through the aligned plate apertures, support rods 53 having mounted thereon tubular spacer elements 54 which serve to maintain plates 51 in spaced relationship with respect to each other. It is to be noted that the ends of rods 53 are fastened to right angle members 55 (Figure 2) which are, in turn, provided with projections 56, these projections serving to mount the plate banks 52 on an endless chain drive assembly in a manner described hereinafter.

To move plate banks 52 continuously in interleaved fashion with the spaced discharge electrode wires 26 of the upstream discharge section and the spaced field electrode plates 27 of the downstream section, a sprocket driven, endless chain drive assembly 58 is provided, this assembly being similar to the drive assembly described in assignee's Patent No. 2,383,111. The assembly 58 of the present invention is vertically disposed in housing 1, intermediate gas inlet passage 2 and gas outlet passage 4, and includes an upper shaft 59 and a lower shaft 61 (Figures 1 and 3) rotatably mounted on suitable bearings (not shown) which are rigidly secured to opposite side walls of housing 1. A pair of laterally spaced suitably notched sprocket 62 are provided on each of the shafts 59 and 61 (Figure 2) and a pair of vertically extending, endless chains 63 are mounted on the upper and lower sprockets adjacent each side of housing 1. Since this chain drive assembly is fully described in detail in the above-mentioned Patent No. 2,383,111, only a portion of the drive assembly is set forth herein.

It is to be noted that, like the chain assembly in U.S. Patent No. 2,383,111, handle-like straps 64 are provided on the lugs of chains 63 to form fixed eyes 65. To mount the plate banks 52 on the spaced endless chains, the projections 56 of plate banks 52 are merely passed through these eyes 65, thus holding the banks in place between the spaced endless chains for interleaving movement between the discharge electrode wires 26 and the field electrode plates 27.

It is to be understood that any one of a number suitable drive motor arrangements (not shown) can be used to drive the endless chain arrangement. Advantageously, the drive motor can be connected to one end of upper shaft 59 and can be mounted outside the housing 1, the drive connection being such as to move the endless chain in a counter-clockwise direction. To guide chains 63 in their movement, U-shaped guide channel members 66 are mounted on the sides of housing 1, the flights of the endless chains 63 passing therebetween. Each channel member 66 is provided with a short side and a long side, the long side having openings therein (not shown) through which sprockets 62 project to engage with chain 63 for driving purposes. The short side of each channel member 66 has bolted thereto a right angle member 67, one leg of which abuts against right angle member 55 of the plate banks 52 to prevent any possible lateral shifting of the banks 52 and thus maintain plates 51 of each bank 52 in properly spaced ararngement with the discharge electrode wires 26 and electrode plates 27 as it passes in interleaved fashion therethrough.

Figure 3:
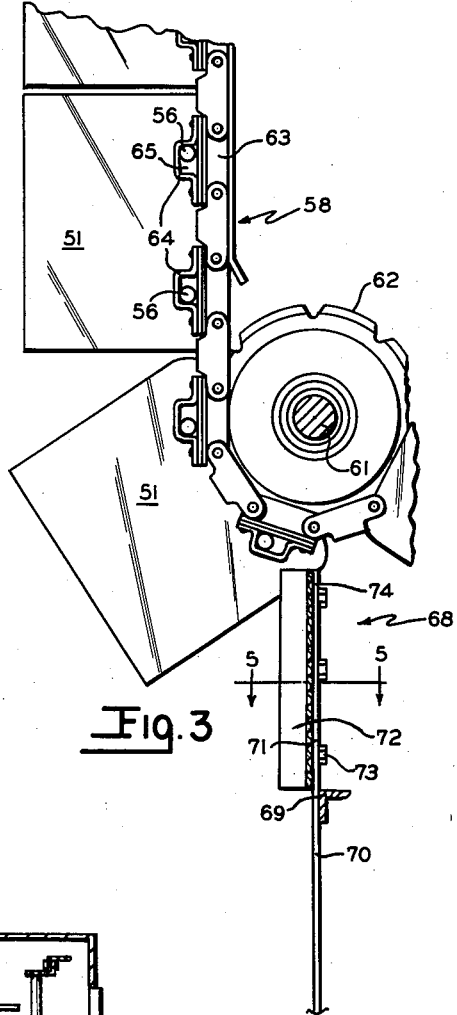
Figure 3 is an enlarged vertical view disclosing further detail of a portion of the sprocket driven, endless chain drive assembly and of the guide means and plate wiping assembly for the collecting electrode plates.
Figure 5:
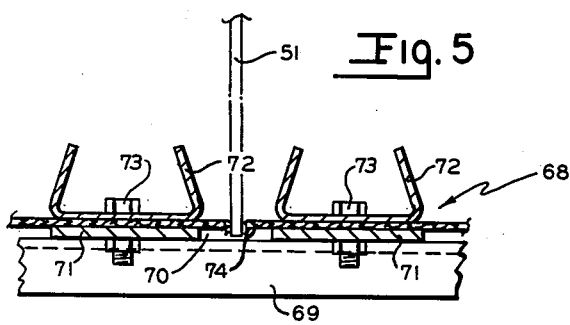
Figure 5 is a horizontal section of the guide means and plate wiping assembly for the collecting electrode plates, taken in a horizontal plane passing through line 5—5 of Figure 3.

In order to clean the collecting electrode plates 51 as they pass out of interleaved arrangement with the discharge electrode wires 26 at the upstream side of housing 1, a plate scraper assembly 68 is provided in the lower portion of housing 1 (Figures 1, 3 and 5). This plate scraper assembly 68 includes a horizontally extending right angle support member 69 extending between and mounted to the sides of housing 1 below the gas passage between gas inlet 2 and gas outlet 4. Fastened to the vertical leg of support member 69 is a vertically extending plate member 70. The plate member 70 can project into the lowermost portion of the hopper, the plate member and the other portions of scraper assembly 68 described herein thus serving to prevent any bypassage of dirty gases below the electrode wires 26 and the consequent re-entrainment of dust particles into the gas stream. It is to be noted that at the upper portion of plate member 70 are the vertical extension arms 71, these extension arms being spaced from each other and extending across the lower portion of housing 1 transverse to and below the gas flow passage to interleave with the plates 51 mounted on chains 63 as the plates are carried out of the gas passage from one flight to the other. Each of extension arms 71 has fastened thereto by means of a U-shaped bracket member 72 and the nut and bolt assembly 73 a swatch 74 of stainless steel braid, the vertical edges of adjacent swatches 74 being substantially in contact with each other to insure a scraping action of the swatches against the sides of the plates 51 of each bank 52 as the bank of plates pass in interleaved fashion through the scraper assembly. It is to be noted that each of U-shaped bracket members 72 has its side legs tapered inwardly toward each other, the bracket members serving not only as facing supports for swatches 74 but, also as guide means to insure proper passage of plates 51 through the adjacent swatches 74 of the scraper assembly. It will be obvious from this description that as collecting plates 51 of each bank 52 pass from the upstream discharge section through the scraper assembly 68, dust collected on the plates is removed by the scraper assembly to settle out into a hopper arrangement at the bottom of housing 1 (not shown in detail).

Not only does the structure of the present invention provide for efficient removal of dust from the collecting electrode structure thereof, but, in addition, provision is made for removing any dust particles that might tend to collect on the discharge electrode wires 26 and field electrode plates 27. In this connection, attention again is directed to Figure 7 of the drawings wherein a right angle structural member 76 can be seen suspended below insulators 9 outside insulator chamber 6 by means of extension rods 77 connected to the insulators. Positioned intermediate rods 77 between the horizontal leg of angle member 76 and the bottom wall of insulator chamber 6 are spaced spring mounts 78 and attached below the horizontal leg of member 76, intermediate spring mounts 78 is a vibrator 79. A pneumatic hose 81 leading from a compressed air source (not shown) is connected to vibrator 79. It is to be understood that vibrator 79 can be one of any number of types well known in the art, the vibrator serving to intermittently impart vibrations to both the wire and plate sections when the occasion so demands to render them free of any dust that might have collected.

In a typical operation of the apparatus described, a suitably high voltage is applied to the discharge ionizer wires 26 and field plates 27 through a power-pack connection not shown. Air or gas to be cleaned is drawn or forced through housing 1 by a suitable blower (not shown) while endless chains 63 are moved in a counterclockwise direction by a drive mechanism (not shown). The adjacent collecting electrode plates 51 move in planes continuously parallel to each other and in interleaved arrangement with the ionizer wire discharge section and the downstream field electrode plate section. As a portion of the collecting plates 51 pass out of the gas flow passage and the interleaved arrangement with discharge ionizer wires 26, they pass into interleaved arrangement with the comb-like scraper assembly 68, the dust removed from the plates 51 by swatches 74 falling into a hopper (not shown) at the bottom of housing 1. The cleaned plates 51 then once again pass into interleaved arrangement with the field plates 27 and ionizer wires 26, the plates 51 being clean on either side of each plate 27 and each wire 26 as they re-enter into the interleaved arrangement to insure a uniform or balanced ionization effect on the gas or air entering the gas inlet passage 2 of housing 1 and to obtain more uniform, efficient precipitation.

Figures 8, 9:
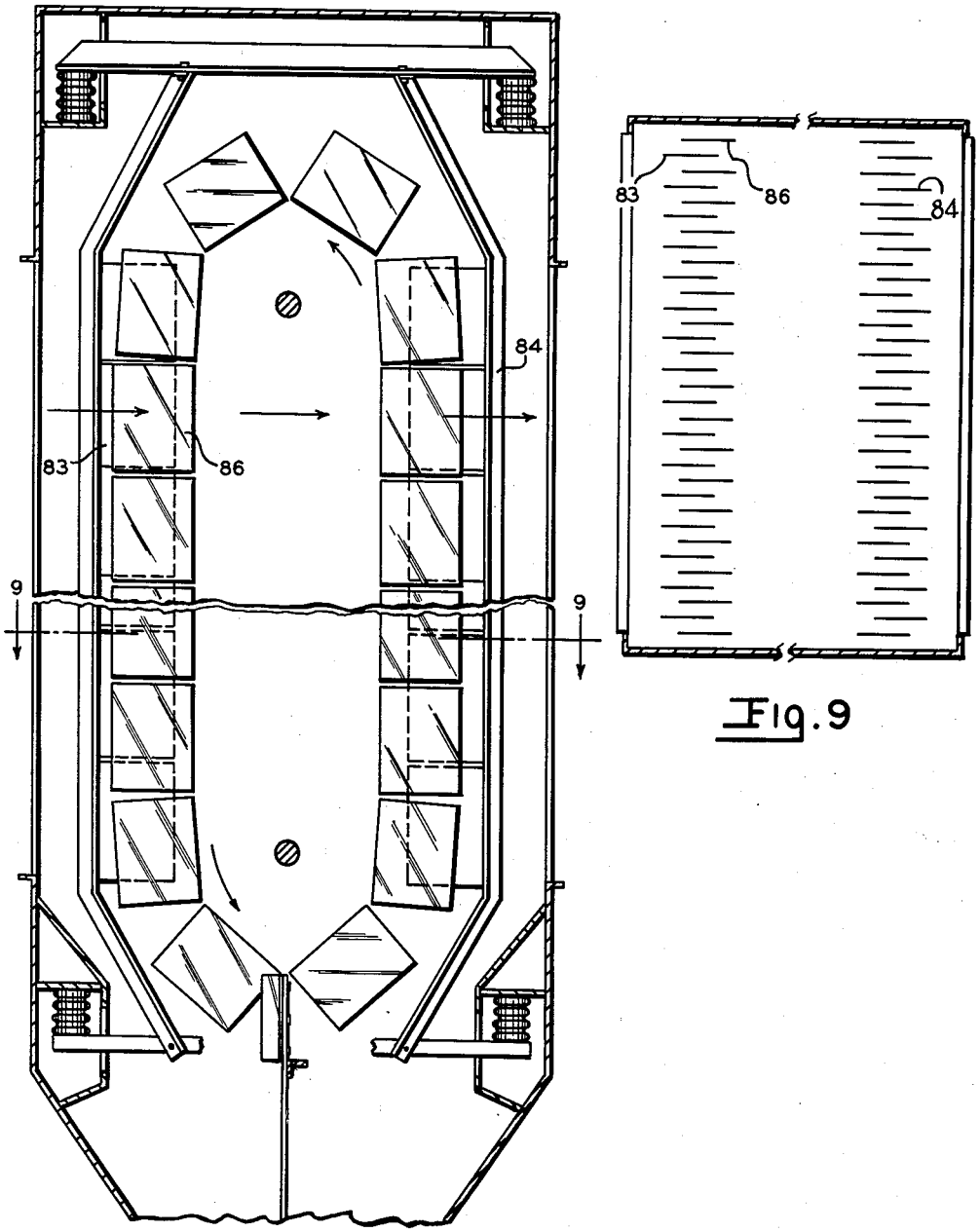
Figure 8 is a vertical schematic section through an electrical precipitator apparatus, disclosing a modified embodiment of the present invention.
Figure 9 is a schematic horizontal reduced section of the apparatus of Figure 8, taken in a horizontal plane passing through line 9—9 of Figure 8.
Figures 10, 11:
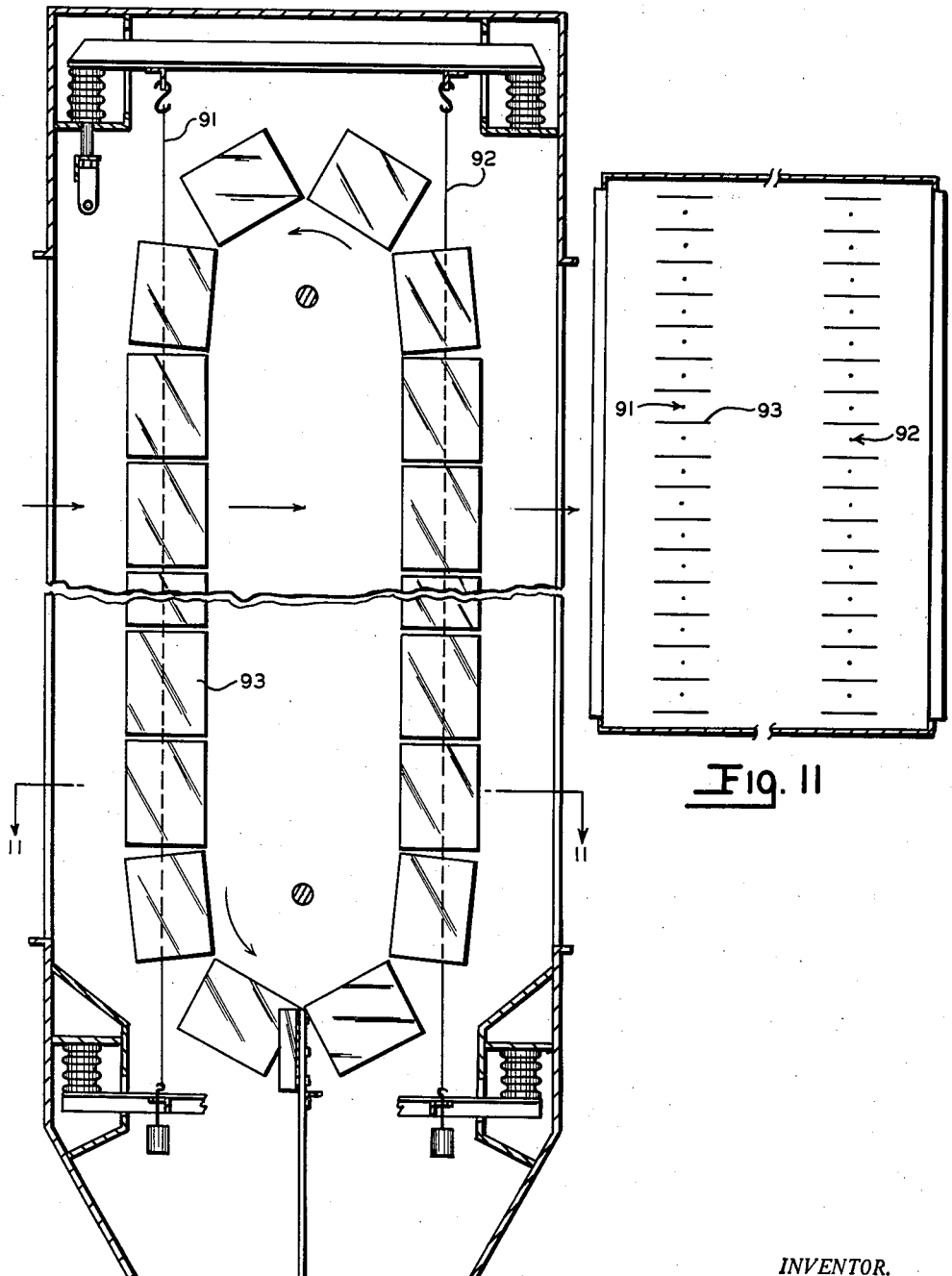
Figure 10 is a vertical schematic section through an electrical precipitator apparatus, disclosing still a further modified embodiment of the present invention; and, Figure 11 is a schematic horizontal reduced section of the apparatus of Figure 10, taken in a horizontal plane passing through line 11—11 of Figure 10.

It is to be understood that the principals of the present invention as described above need not be limited to the structure disclosed in Figures 1–7. For example, in Figures 8 and 9, an arrangement is disclosed wherein the electrode sections are not made up of ionizing wires and plates, respectively, as in Figures 1–7, but rather as a first field electrode plate section 83 and a second field electrode plate section 84 interleaved between the moveable collecting plates 86. Further, in Figures 10 and 11 an arrangement is disclosed wherein the electrode sections upstream and downstream include ionizing wire sections 91 and 92 respectively, these ionizing wire sections interleaving with moveable collecting electrode plates 93.

It will be obvious that with a number of housing units such as those disclosed in Figures 8 through 11, various arrangements of series and parallel precipitator assemblies can be provided to meet varying circumstances. For example, a series precipitator arrangement can be provided which would comprise an overall housing arrangement having gas inlet and gas outlet means spaced to define a gas flow passage therebetween, the housing arrangement including a first housing unit as in Figures 10 and 11 at the gas inlet side of the arrangement to serve as the ionizing section of the precipitator and a second housing unit as in Figures 8 and 9 adjacent the downstream side of the housing unit of Figures 10 and 11 to serve as the field electrode section of the precipitator.

The invention claimed is:

1. In an electrical precipitator having a housing with gas inlet and gas outlet means spaced to define a gas flow passage therebetween, an ionizing section disposed in said gas flow passage adjacent said gas inlet means, said ionizing section including elongated ionizing electrode means and collecting electrode means extending adjacent and across said gas inlet means, said collecting electrode means being spaced from said ionizing means on opposite sides thereof, and means to move said collecting electrode means parallel to and substantially along the entire length of and on opposite sides of said elongated ionizing means into and out of said ionizing section through a zone positioned outside said gas flow passage in paths continuously parallel to each other.

2. In an electrical precipitator having a housing with gas inlet and gas outlet means spaced to define a gas flow passage therebetween an ionizing section disposed in said gas flow passage adjacent said gas inlet means, said ionizing section including elongated ionizing electrode means and collecting electrode means extending adjacent to and across said gas inlet means, said collecting electrode means being spaced from said ionizing means on opposite sides thereof, means to move said collecting electrode means parallel to and substantially along the entire length of and on opposite sides of said elongated ionizing means into and out of said ionizing section through a zone positioned outside said gas flow passage in paths continuously parallel to each other, and means to clean said collecting electrode means as said collecting electrode means pass through said zone and before they are reintroduced into said ionizing section.

3. In an electrical precipitator having a housing with gas inlet and gas outlet means spaced to define a gas flow passage therebetween, an ionizing section disposed in said gas flow passage adjacent said gas inlet means, said ionizing section including a series of spaced elongated ionizing electrodes extending adjacent to and transversely across said gas flow inlet, a series of spaced collecting electrodes extending adjacent to and across said gas inlet, said collecting electrodes being interleaved in spaced relation with said ionizing electrodes so as to be on opposite sides of said ionizing electrodes, means to move said collecting electrodes parallel to said elongated ionizing electrodes substantially along the entire length thereof into and out of said ionizing section through a zone positioned outside said gas flow passage in paths continuously parallel to each other, and means to clean said collecting electrodes as said collecting electrodes pass through said zone and before they are reintroduced into said ionizing section.

4. In an electrical precipitator having a housing with gas inlet and gas outlet means spaced to define a gas flow passage therebetween, an ionizing section disposed in said gas flow passage transverse to and adjacent said gas inlet means, said ionizing section including a series of spaced ionizing electrode wires extending adjacent to and transversely across said gas flow inlet, a series of spaced parallel collecting electrode plates extending adjacent to and across said gas inlet means, said collecting electrode plates being interleaved in spaced relation with said ionizing electrode wires so as to be on opposite sides of said ionizing electrode wires, means to move said collecting electrode plates in paths continuously parallel to each other and relative said ionizing electrode wires substantially along the entire length thereof into and out of a zone positioned outside said gas flow passage, and means to clean said collecting electrode plates outside said gas flow passage of said ionizing section before any of said electrodes are reintroduced into said ionizing section adjacent said gas inlet means.

5. In an electrical precipitator having a housing with gas inlet and gas outlet means spaced to define a gas flow passage therebetween, an electrode section in said gas flow passage extending adjacent to and across said gas inlet and including a series of spaced stationary electrodes and a series of movable spaced parallel collecting electrode plates interleaved in spaced relation with said stationary electrodes and movable in continuously parallel paths substantially along the entire length of said stationary electrodes and through a zone outside said gas flow passage, and a bank of spaced parallel plate-wiping elements mounted in said zone outside said gas flow passage, said plate wiping elements extending within said housing in said zone to form a seal and prevent by-passage of any dirty gases around said electrode section.

6. In an electrical precipitator having a housing with gas inlet and gas outlet means spaced to define a gas flow passage therebetween, an electrode section in said gas flow passage extending adjacent to and across said gas inlet and including a series of spaced stationary electrodes and a series of movable spaced parallel collecting electrode plates interleaved in spaced relation with said discharge electrodes and movable in continuously parallel paths substantially along the entire length of said stationary electrodes and through a zone outside said gas flow passage, a bank of spaced parallel plate-wiping elements mounted in said zone, said plate-wiping elements being arranged to interleave and wipe the faces of said collecting electrode plates as they pass through said zone, and guide means adjacent said plate-wiping elements to insure said collecting plates properly pass through said wiping elements without jamming.

7. An electrical precipitator comprising a housing arrangement having a gas inlet and gas outlet means spaced to define a gas flow passage therebetween within said housing arrangement, a first electrode section in said gas flow passage adjacent said gas inlet means and a second electrode section spaced from said first section in said gas flow passage adjacent said gas outlet means, said first and second electrode sections each including spaced electrode means with the electrode means of at least said first section comprising an ionizing means, spaced collecting electrode means arranged to interleave the spaced electrode means of said first and second electrode sections, means to move said spaced collecting electrode means relative said first and second electrode sections and through a zone outside said gas flow path, and means to clean said collecting electrode means while in said zone.

8. An electrical precipitator comprising a housing having gas inlet and gas outlet means spaced to define a gas flow passage therebetween within said housing, a first electrode section in said gas flow passage adjacent to and extending across said gas inlet means and a second electrode section spaced from said first section in said gas flow passage adjacent said gas outlet means, said first and second electrode sections each including discharge electrode means in the form of ionizing wires spaced transversely across said gas flow path, collecting electrode plate means spaced to interleave with the spaced ionizing wires of each section, means to move said collecting electrode plate means substantially along the entire length of said discharge electrode means and between said first and second electrode sections through a zone outside said gas flow path, and means to clean said collecting electrode plate means while in said zone.

9. In combination with an electrical precipitator including a housing arrangement having gas inlet and gas outlet means spaced to define a gas flow passage therebetween and an ionizing section adjacent said gas inlet means, a housing unit adjacent said downstream side of said ionizing section, said housing unit comprising first and second electrode sections each including field electrode means in the form of field electrode plates spaced transversely across said gas flow path, collecting electrode plate means spaced to interleave with the spaced field electrode plates of each section, means to move said collecting electrode plate means between said first and second field electrode sections through a zone outside said gas flow path, and means to clean said collecting electrode plate means while in said zone.

10. An electrical precipitator comprising a housing having gas inlet and gas outlet means spaced to define a gas flow passage therebetween within said housing, a first electrode section in said gas flow passage adjacent said gas inlet means and a second electrode section spaced from said first section in said gas flow passage adjacent said gas outlet means, said first electrode section including discharge means in the form of ionizing wires spaced transversely across said gas flow passage and said second electrode section including field electrode means in the form of electrically charged plates spaced transversely across said gas flow passage, collecting electrode plate means spaced to interleave with the electrode means of each section, means to move said collecting electrode plate means between said first and second electrode sections through a zone outside said gas flow path, and means to clean said collecting electrode plate means while in said zone.

11. An electrical precipitator comprising a housing having gas inlet and gas outlet means spaced to define a gas flow passage therebetween within said housing, a first electrode section within said housing in said gas flow passage adjacent said gas inlet means and a second electrode section within said housing spaced from said first section in said gas flow passage adjacent said gas outlet means, said first and second electrode sections each including spaced electrode means with the electrode means of at least said first section comprising an ionizing means, spaced collecting electrode means to interleave the spaced electrode means of both first and second electrode sections, a power driven endless chain arrangement connected to said spaced collecting electrode means to move said collecting electrode means between said first and second electrode sections through a zone outside said gas flow path, and means to clean said collecting electrode means while in said zone.

12. An electrical precipitator comprising a housing having gas inlet and gas outlet means spaced to define a gas flow passage therebetween within said housing, a first electrode section within said housing in said gas flow passage adjacent said gas inlet means and a second electrode section within said housing spaced from said first section in said gas flow passage adjacent said gas outlet means, said first and second electrode sections each including spaced electrode means with the electrode means of at least said first section comprising a plurality of ionizing wires spaced transversely across said gas flow passage, a pair of spaced endless chains, each disposed in a plane extending between said first and second electrode sections with the plane of one chain being parallel to and spaced from the plane of the other chain, parallel banks of spaced collecting electrode plates mounted on each of said endless chains one above the other and arranged to interleave said spaced electrode means of both said first and second electrode sections, and drive means connected to said pair of endless chains to move said banks of spaced collecting electrode plates between said first and second electrode sections, said chains being arranged to move said collecting electrode plates through a zone outside said gas flow passage.

13. The apparatus of claim 12, and means to clean said collecting electrode means while in said zone outside said gas flow passage.

14. An electrical precipitator comprising a housing having gas inlet and gas outlet means spaced to define a gas flow passage therebetween within said housing, a first electrode section within said housing in said gas flow passage adjacent said gas inlet means and a second electrode section within said housing spaced from said first section in said gas flow passage adjacent said gas outlet means, said first and second electrode sections each including spaced electrode means with the electrode means of at least said first section comprising a plurality of ionizing wires spaced transversely across said gas flow passage, a pair of spaced endless chains, each disposed in a plane extending between said first and second electrode sections with the plane of one chain being parallel to and spaced from the plane of the other chain, parallel banks of spaced collecting electrode plates mounted on each of said endless chains one above the other and arranged to interleave said spaced electrode means of both said first and second electrode sections, drive means connected to said pair of endless chains to move said banks of spaced collecting electrode plates between said first and second electrode sections, said chains being arranged to move said collecting electrode plates through a zone outside said gas flow path, a bank of spaced parallel plate-wiping elements mounted in said zone arranged to interleave and wipe the faces of said collecting electrode plates as they pass through said zone, and guide means adjacent said plate wiping elements to insure said collecting plates properly pass through said wiping elements wthout jamming.

15. In an electrical preciptator having a housing with gas inlet and gas outlet means spaced to define a gas flow passage therebetwen, an ionizing section disposed in said gas flow passage transverse to and adjacent said gas inlet means, said ionizing section including a series of spaced ionizing electrode wires extending transversely across said gas flow passage, means to maintain said wires in alignment intermediate their ends, a series of spaced parallel collecting electrode plates interleaved in spaced relation with said ionizing electrode wires so as to be on opposite sides of said ionizing electrode wires, and means to move said collecting electrode plates in paths continuously parallel to each other and relative said ionizing electrode wires into and out of a zone positioned outside said gas flow passage.

References Cited in the file of this patent

UNITED STATES PATENTS

| | | |
|---|---|---|
| 1,394,771 | Kennard | Oct. 25, 1921 |
| 1,869,335 | Day | July 26, 1932 |
| 2,383,111 | Dahlman | Aug. 21, 1945 |
| 2,383,112 | Dahlman | Aug. 21, 1945 |

FOREIGN PATENTS

| | | |
|---|---|---|
| 617,411 | France | Nov. 20, 1926 |
| 713,691 | France | Aug. 17, 1931 |